(12) United States Patent
Kawaguchi et al.

(10) Patent No.: US 6,605,228 B1
(45) Date of Patent: Aug. 12, 2003

(54) METHOD FOR FABRICATING PLANAR OPTICAL WAVEGUIDE DEVICES

(75) Inventors: Shigeru Kawaguchi, Yokohama (JP); Michiya Masuda, Yokohama (JP); Yutaka Natsume, Yokohama (JP); Takayuki Senda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 176 days.

(21) Appl. No.: 09/616,224

(22) Filed: Jul. 14, 2000

Related U.S. Application Data

(63) Continuation-in-part of application No. 09/175,137, filed on Oct. 19, 1998.

(30) Foreign Application Priority Data

| Aug. 6, 1999 | (JP) | ............................................ 11-224312 |
| Apr. 27, 2000 | (JP) | ....................................... 2000-128082 |
| Apr. 27, 2000 | (JP) | ....................................... 2000-128092 |

(51) Int. Cl.$^7$ .......................................... C03B 37/075
(52) U.S. Cl. ............................ 216/24; 216/39; 65/379; 65/384; 65/385
(58) Field of Search ....................... 216/24, 39; 65/379, 65/384, 385

(56) References Cited

U.S. PATENT DOCUMENTS

| 5,858,051 A | 1/1999 | Komiyama et al. ........... 65/386 |
| 6,122,934 A | 9/2000 | Narita et al. ................... 65/379 |
| 6,205,818 B1 * | 3/2001 | Seward, III ................... 65/33.2 |

FOREIGN PATENT DOCUMENTS

| JP | 61-210304 | 9/1986 |
| JP | 1-189614 | 7/1989 |

OTHER PUBLICATIONS

Patent Abstracts of Japan, Publication No. 08043653, Feb. 16, 1996.
Patent Abstracts of Japan, Publication No. 10197737, Jul. 31, 1998.
Patent Abstracts of Japan, Publication No. 11125727, May 11, 1999.

* cited by examiner

Primary Examiner—Shrive P. Beck
Assistant Examiner—Allan Olsen
(74) Attorney, Agent, or Firm—MacPherson Kwok Chen & Heid LLP

(57) ABSTRACT

Proposed is a method for fabricating a planar optical waveguide device having a plurality of core segments formed between a lower clad layer and an upper clad layer, in which a hot isostatic pressing process (HIP) is carried out during the fabrication process. The lower clad layer may consist of a substrate or a buffer layer formed on a substrate. Each layer may be formed either by a low-temperature film-forming process such as CVD or by the flame hydrolysis pressing process. The HIP process is also effective in eliminating voids when the core is formed in a recess of the lower clad layer. According to the tests conducted by the inventors, it was found that the HIP process can be conducted without requiring any protective layer or a gas barrier through proper selection of the condition for the HIP process, as opposed to the common belief that a protective layer or a gas barrier is essential for the HIP process.

7 Claims, 10 Drawing Sheets

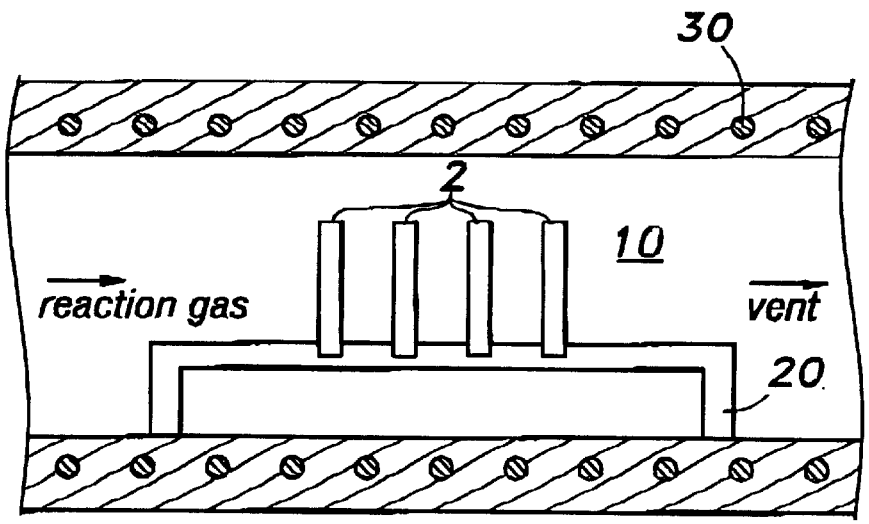
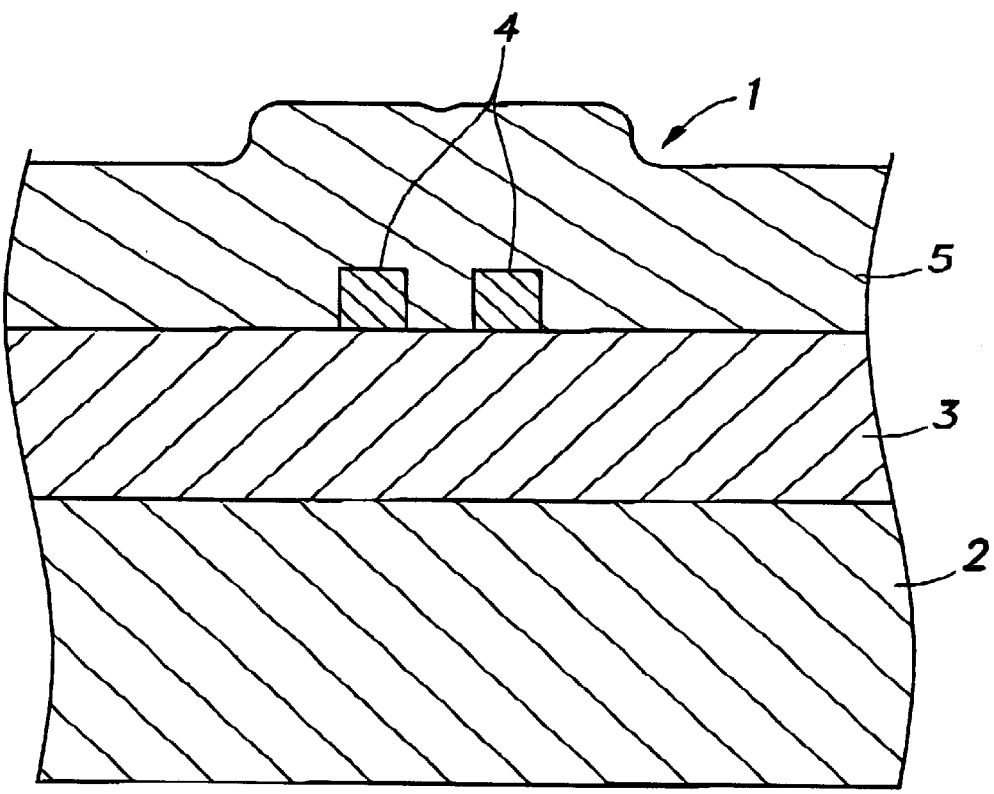

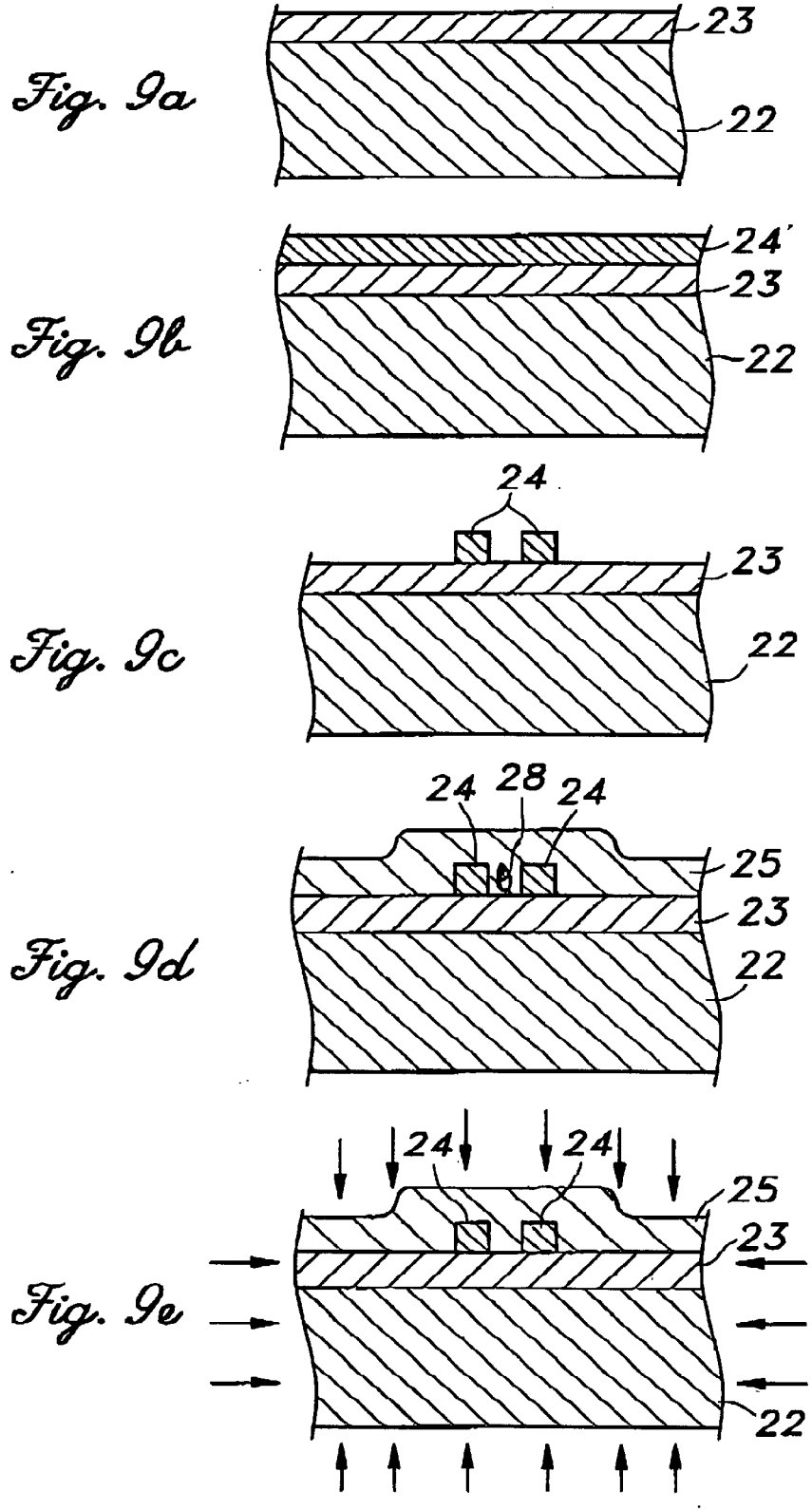

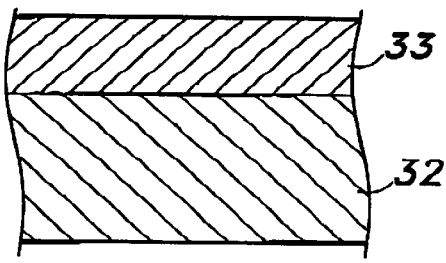
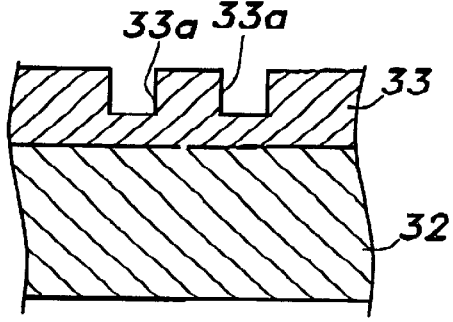
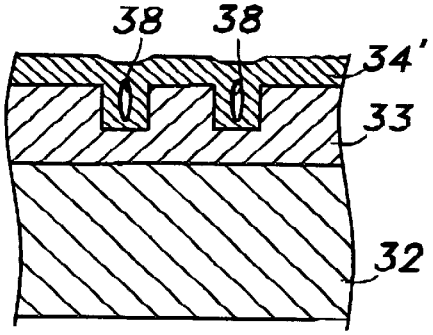
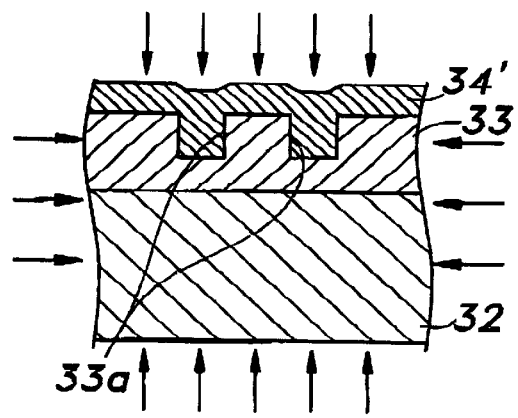
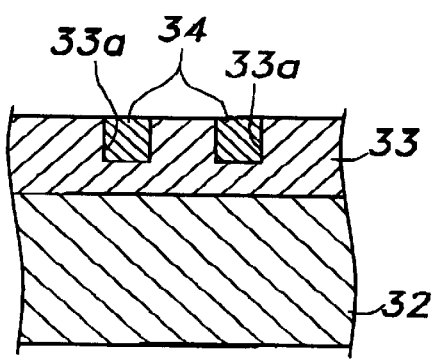
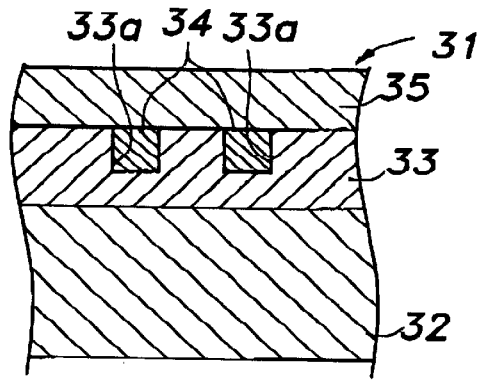

METHOD FOR FABRICATING PLANAR OPTICAL WAVEGUIDE DEVICES

This application is a continuation-in-part of U.S. application Ser. No. 09/175,137, filed on Oct. 19, 1998. This application also claims priority to Japanese Patent Application No. 11-224312, filed on Aug. 6, 1999, Japanese Patent Application No. 2000-128082, filed on Apr. 27, 2000, and Japanese Patent Application No. 2000-128092, filed on Apr. 27, 2000.

TECHNICAL FIELD

The present invention relates to planar optical waveguide devices, and in particular to a method for fabricating planar optical waveguide devices which are, not exclusively, suited for use in the field of optical communication.

BACKGROUND OF THE INVENTION

Planar optical waveguide devices have been conventionally Used in the field of optical communication in such forms as star couplers or signal splitters. Such an optical waveguide device is typically provided with an embedded waveguide structure based on a step-wise refractive index distribution.

Japanese patent laid open publications Nos. 61-210304 and 1-189614 disclose planar optical waveguide devices having an embedded structure. The various layers are formed either by CVD or deposition of glass powder followed by sintering (FHD: flame hydrolysis deposition). Japanese patent laid open publication No. 61-210304 proposes to form a recess in a substrate to form a core therein. To achieve a desired circular cross section, the recess having a rectangular cross section is fire polished so as to have a more circular cross section as illustrated in FIG. 1 of this prior patent publication. Such a waveguide device can be fabricated as summarized in the following.

First of all, a substrate or a buffer layer serving as a lower clad layer is prepared, and a core layer is formed on the lower clad layer. The core layer is appropriately patterned into core segments of a desired configuration typically by reactive ion etching (RIE). Then, an upper clad layer is placed on both the core and the lower clad layer. The obtained assembly is then cut into a desired size and configuration, and the input and output ends of the assembly is polished into optical planes. These layers are typically made of $SiO_2$, and a desired refractive index distribution can be achieved by adding suitable dopants to the appropriate layers.

A low-temperature film-forming process such as CVD, plasma CVD, PVD, and vacuum PVD is advantageous in controlling the thickness of each layer, and evenly distributing dopants in each layer. However, the upper clad layer may fail to fill the gaps between adjacent core segments or the material for the core may fail to fill the recess in the lower clad layer, and voids may develop in the upper clad layer or the core. Such voids are known to reduce the transmission efficiency of the device due to the scattering of the signal light, and are desired to be eliminated. When a recess is formed in the lower clad layer to form the core in the recess, the upper clad layer may be placed on a planar surface, and creation of voids in the upper clad layer can be avoided. However, voids tend to be produced in the core by the material of the core failing to fill the recess completely.

FHD involves a higher temperature, and allows the material to fill gaps or recesses more freely, in particular by properly selecting the softening point of the selected glass material. However, controlling the softening point requires addition of dopants which are also known to change the refractive index of the material. Therefore, it is difficult to adjust the amount and selection of dopants which would result in a desired softening point and refractive index at the same time. Oftentimes, a desired softening point may not be achieved, and voids may be created in the upper clad layer or the core. Also, an even distribution of dopants is difficult to achieve with FHD. Raising the temperature of the glass material may be beneficial in softening the glass material and evenly distributing the dopants, but may soften the already formed layer or may cause the dopants to migrate from one layer to another.

The inventors proposed the use of the hot isostatic pressing (HIP) process for removing voids that may be created in the upper clad layer in the copending patent application No. 9/175,137 filed Oct. 19, 1998. The contents of this copending patent application are hereby incorporated in this application by reference.

BRIEF SUMMARY OF THE INVENTION

In view of such problems of the prior art, a primary object of the present invention is to provide a method for fabricating planar optical waveguide devices which can eliminate voids that may develop in the core and/or upper clad layer of an optical waveguide device.

A second object of the present invention is to provide a method for fabricating planar optical waveguide devices which can minimize the possibility of defective products, and can thereby reduce the fabrication cost of each unit.

A third object of the present invention is to provide a method for fabricating planar optical waveguide devices which can fabricate durable devices through elimination of residual stresses in each layer of the device.

According to the present invention, such objects can be accomplished by providing a method for fabricating a planar optical waveguide device having a plurality of core segments formed between a lower clad layer and an upper clad layer, comprising the steps of: preparing a lower clad layer consisting of a glass substrate; forming a core layer on said lower clad layer; patterning said core layer into a plurality of core segments; forming an upper clad layer on said lower clad layer and said core segments, and conducting a hot isostatic pressing process on an assembly of said lower clad layer, core segments and upper clad layer at a temperature higher than 800° C. and a pressure higher than 1,000 $kgf/cm^2$.

The lower clad layer may consist of a substrate or a buffer layer formed on a substrate. Each layer may be formed either by a low-temperature film-forming process or by the FHD process. The HIP process is also effective in eliminating voids when the core is formed in a recess of the lower clad layer. According to the tests conducted by the inventors, it was found that the HIP process can be conducted without requiring any protective layer or a gas barrier through proper selection of the condition for the HIP process, as opposed to the common belief that a protective layer or a gas barrier Is essential for the HIP process.

BRIEF DESCRIPTION OF THE DRAWINGS

Now the present invention is described in the following with reference to the appended drawings, in which:

FIG. 4 is a schematic view of a CVD device for conducting a low-temperature film-forming process according to the present invention;

FIG. 5 is a view similar to FIG. 2 showing the a second embodiment of the present invention;

FIGS. 9a to 9e are views similar to FIGS. 3a to 3d showing the fabrication steps for a fifth embodiment of the present invention.

FIGS. 11a to 11f are views similar to FIGS. 3a to 3d showing the fabrication steps for a sixth embodiment of the present invention.

DETAILED DESCRIPTION OF THE PREFERRED EMBODIMENTS

Figure 1:
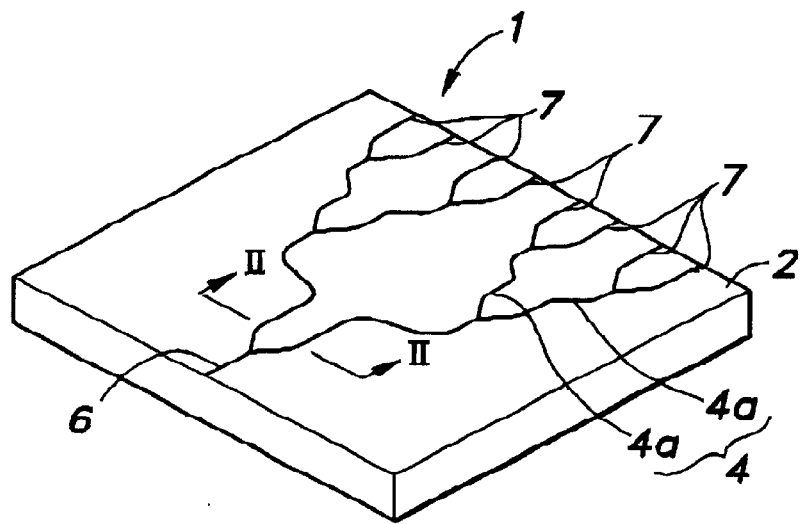
FIG. 1 is a perspective view of a planar optical waveguide device embodying the present invention.

FIG. 1 is a perspective view of a planar optical waveguide device embodying the present invention. This device 1 has an embedded waveguide structure, and includes a core 4 having a branched configuration and consisting of a number of core segments 4a, to split optical signals in the field of optical communication, for instance. Typically, an input signal is applied to an input end 6 of the core 4 defined on one side of the device, and an output signal is produced from each one of a plurality of output ends 7 of the core 4 defined on the opposite side of the device.

Figure 2:
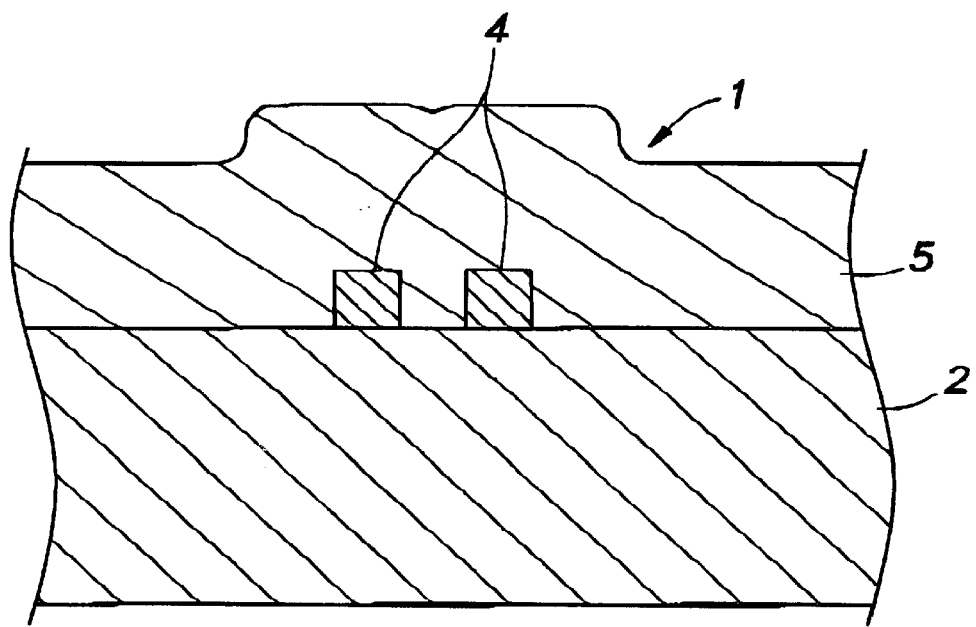
FIG. 2 is an enlarged sectional view taken along line II—II of FIG. 1.

Referring to FIG. 2, the core 4 is formed on a substrate 2 serving as a lower clad layer, and an upper clad layer 5 is formed over both the core 4 and the otherwise exposed surface of the substrate 2. The substrate 2 consists of silica glass in this case.

The core 4 has a 8 by 8 $\mu$m square cross section, and has a slightly higher refractive index than the substrate 2 and the upper clad layer 5, to conduct signal light therein according the well-known principle of fiber optics. The upper clad layer 5 typically has a thickness of 25 $\mu$m.

Figure 3A:
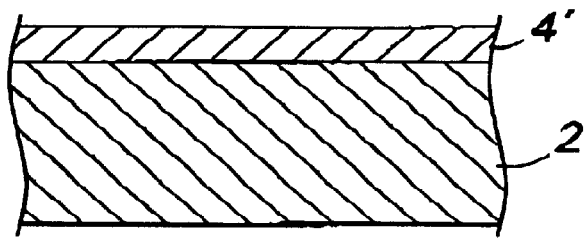
FIGS. 3a to 3d are sectional views, each similar to FIG. 2, showing the fabrication steps for a first embodiment.

The fabrication process for this optical waveguide device is described in the following with reference to FIGS. 3a to 3d. A core layer 4' essentially made of $SiO_2$ is formed on the surface of the silica glass substrate 2 by a low-temperature film-forming process such as chemical vapor deposition (CVD) at a temperature of 500° C. (FIG. 3a). At this time, the core layer 4' is appropriately doped by using one or more of the dopants selected from a group consisting of phosphorus (P), titanium (Ti), germanium (Ge), aluminum (Al), boron (B) and fluoride (F) for the purpose of increasing the refractive index of the core layer 4' by 0.2 to 0.8% over that of the substrate 2. Phosphorus (P), titanium (Ti), germanium (Ge) and aluminum (Al) are known to raise the refractive index while boron (B) and fluoride (F) are known to lower the refractive index. By using one of them or two or more of them in combination, a desired refractive index can be achieved.

Typically, the refractive index of the core layer 4' is matched with or made to agree with that of the core of the optical fiber that is to be connected to the optical waveguide device 1. In the present embodiment, only the core layer 4' is doped, and the substrate 2 and the upper clad layer 5 are not doped. If necessary, the substrate 2 and the upper clad layer 5 may also be doped so that the refractive index of the substrate and the upper clad layer may be made adequately lower than that of the core layer 4' while the refractive index of the core layer 4' is matched with that of the core of the optical fiber.

FIG. 4 shows a CVD system for conducting a CVD process. The substrates 2 are held by a holder 20 inside a reaction chamber 10 and reaction gases are passed through the reaction chamber 20 while the substrates 2 arc heated by a heater 30 so as to form the core layer 4' on the surface of each substrate 2. However, the process for forming the core layer 4' is nut limited to the CVD process, but may also consist of a plasma CVD, physical vapor deposition (PVD), vacuum vapor deposition, sputtering, ion plating and other lower-temperature film-forming processes.

Figure 3B:
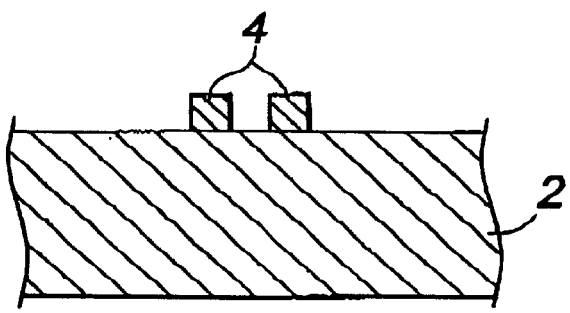

Optionally, a preliminary heating process may be conducted under a pressure or at the atmoshperic pressure. Preferably, the temperature involved in this heating process may be higher than that for the film-forming step for the core layer 4' but lower than that for the subsequent heating/pressurizing step (which is described hereinafter). A prescribed waveguide pattern is defined on the surface of the core layer 4' with photoresist, and the core 4 having a desired waveguide pattern is formed by etching such as RIE (reactive ion etching) (FIG. 3b).

Figure 3C:
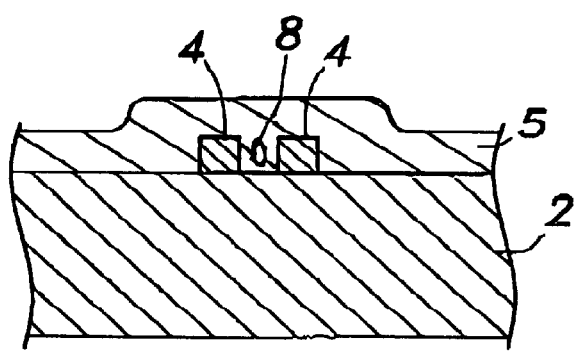

The upper clad layer 5 essentially made of $SiO_2$ having a relatively low refractive index is formed by a similar low-temperature film-forming process (FIG. 3c). At this stage, voids S tend to develop in the gaps between adjacent segments of the core 4 by the material of the upper clad layer 5 failing to entirely fill into the gaps, particularly when the core segments are disposed closely next to each other.

Figure 3D:
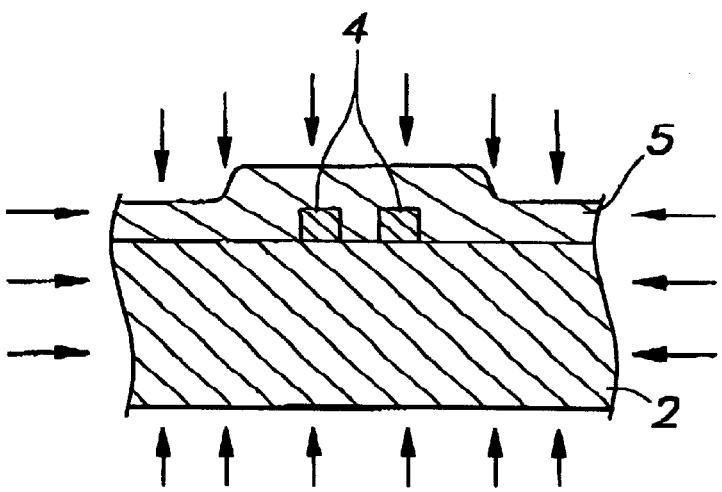

These voids 8 can be eliminated by applying both heat and pressure to the device 1 (hot isostatic pressing: HIP) with the surface of the upper clad layer 5 exposed. The heat and pressure also help remove internal stresses that may have developed in the substrate 2 and the layers 4 and 5 deposited thereon during the film-forming steps (FIG. 3d). The HIP process typically involves the pressurization of the device at 1,500 $kgf/cm^2$ by using inert gas such as argon (Ar) at a temperature of 1,200° C. over a time period of about two hours Because the pressure is uniformly applied to the device, the shape of the device would not be changed.

The inventors observed how extensively voids are eliminated depends on the temperature and pressure conditions of the HIP process as summarized in Table 1. The temperature was changed to 800, 1,000 and 1,500° C., and the pressure was changed to 300, 1,000, 1,500 aid 1,700 $kgf/cm^2$.

TABLE 1

| | pressure ($kgf/cm^2$) | | | |
|---|---|---|---|---|
| temperature (° C.) | 300 | 1,000 | 1,500 | 1,700 |
| 800 | voids | voids | voids | voids |
| 1,000 | voids | voids | voids | no voids |
| 1,100 | voids | voids | no voids | no voids |

As can be seen from Table 1, when the pressure was 300 and 1,000 $kgf/cm^2$, it was not possible to remove voids under a practical temperature. Likewise, when the temperature was 800° C., it was not possible to remove voids by applying a practical pressure. The temperature had to be 1,100° C. or higher when the pressure was 1,500 kgf/cm$^2$, and 1,000° C. or higher when the pressure was 1,700 kgf/cm$^2$. Therefore, the lower limits of the pressure and temperature for removing voids in the HIP process may be expressed as being either 1,500 kgf/cm$^2$ and 1,100° C., or 1,700 kgf/cm$^2$ and 1,000° C.

One may fear that a protective layer or a gas barrier may be needed on the surface of the upper clad layer during the HIP process because the reaction gas such as argon (Ar) may seep into the upper clad layer, thereby impairing the optical and mechanical properties of the upper clad layer 5. However, according to the tests conducted by the inventors, it was found that such a seeping of argon gas would not impair the durability of the device for practical purposes even when the HIP process was conducted in such a manner that voids are successfully eliminated and the internal stress that may have developed in the upper clad layer and the core layer during the film-forming steps are removed. The elimination of the need for such a protective layer during the HIP process substantially simplifies the fabrication process for the device.

Finally, the substrate 2 is cut into the desired size and shape with a dicing machine, and the end surfaces for the input and outer ends 6 and 7 are polished into optical planes.

FIG. 5 shows a second embodiment of the present invention. A buffer layer 3 serving as a lower clad layer is formed on a substrate 2 consisting of a wafer of silica glass, ceramics or semiconductor, and a core 4 is formed on the buffer layer 3. An upper clad layer 5 is then formed over both the buffer layer 3 and the core 4.

The fabrication process for the second embodiment is described in the following with reference to FIGS. 6a to 6e. First of all, the buffer layer 3 made of SiO$_2$ is formed on the surface of the substrate 2 with a low-temperature film-forming process such as CVD (FIG. 6a), similarly as the first embodiment. Likewise, a core layer 4' made of SiO$_2$ is formed on the surface of the buffer layer 3 with a low-temperature film-forming process such as CVD (FIG. 6b), similarly as the first embodiment. A dopant is added to the core layer 4' to control the refractive index of the core layer 4'. If desired, at this stage, a preliminary heating process may be conducted either at a high pressure or atmospheric pressure.

Figure 6A:
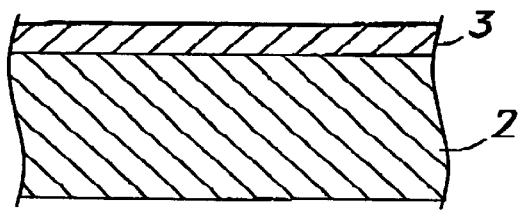
FIGS. 6a to 6e are views similar to FIGS. 3a to 3d showing the fabrication steps for the second embodiment of the present invention.
Figure 6B:
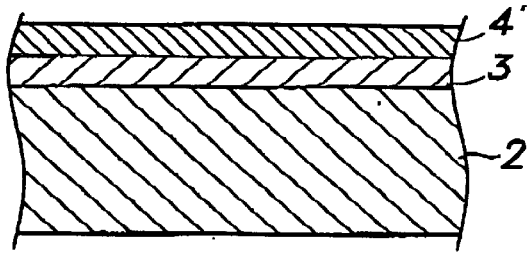
Figure 6C:
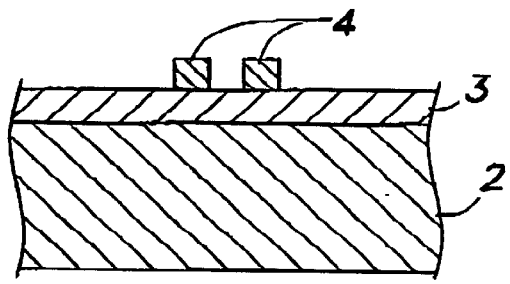

A waveguide pattern is formed on the surface of the core layer 4' by using photoresist, and a waveguide core 4 of a prescribed pattern is them formed by etching the core layer 4' by RIE, for instance (FIG. 6c).

Figure 6D:
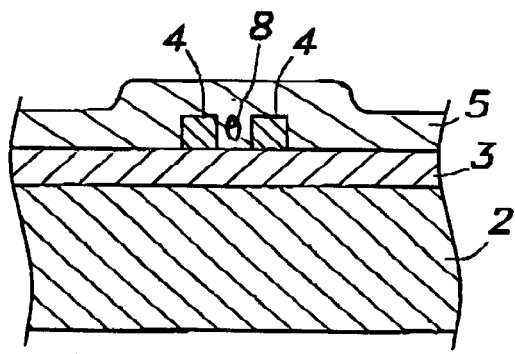
Figure 6E:
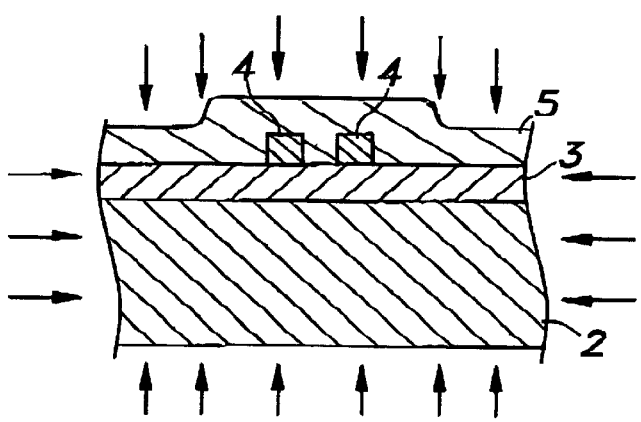

An upper clad layer 5 having a relatively low refractive index is formed over the core 4 and the buffer layer 3 by CVD (FIG. 6d). If necessary, a dopant may be added to both the buffer layer 3 and the upper clad layer 5 to lower the refractive index of these layers.

The device 1 is then subjected to the HIP process with the surface of the upper clad layer 5 exposed so that the voids 8 may be reduced to a tolerable level or totally eliminated, and the internal stresses that may have developed in the substrate 2 and the layers 3,4 and 5 formed thereon during the film-forming steps (FIG. 6c). The produced assembly is then cut into the desired size and shape, and the input and output ends of the device are polished into optical planes.

Figure 7A:
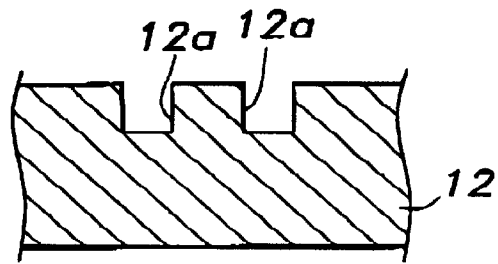
FIGS. 7a to 7e are views similar to FIGS. 3a to 3d showing the fabrication steps for a third embodiment of the present invention.
Figure 7B:
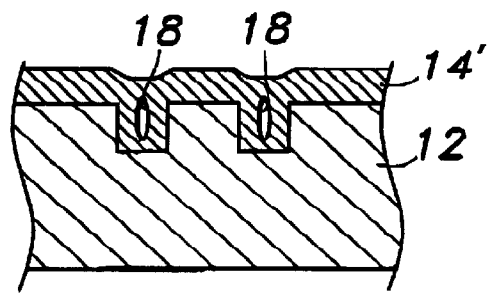
Figure 7C:
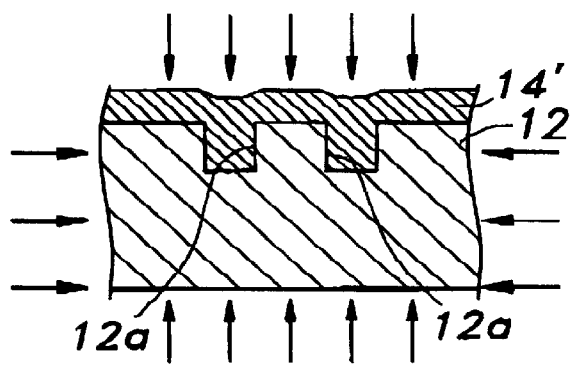

FIGS. 7a to 7c show the fabrication process for a third embodiment of the present invention. First of all, a photoresist layer in a prescribed waveguide pattern is placed on the surface of a substrate 12 which may be made of silica glass, and an etching process such as RIE is conducted on the substrate 12 to form a recess 12a in the prescribed pattern (FIG. 7a).

A core layer 14' is formed on the surface of the substrate 12 by a low-temperature film-forming process such as CVD (FIG. 7b). At this point, a dopant is added to the core layer 14' to raise the refractive index of the core layer 14' by 0.2 to 0.8% from that of the substrate 12. The core layer 14', in particular the part of the core layer which is inside the recess 12a may contain voids 18 therein by the core material failing to flow into and fill the recess 12a.

Figure 7D:
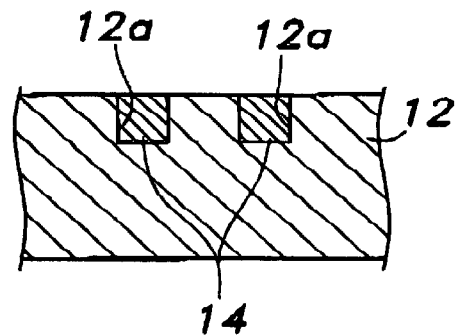

Thereafter, the produced assembly is subjected to the HIP process with the surface of the core layer 14' exposed so as to reduce or eliminate the voids 18 and remove the internal stresses that may have developed in the substrate 12 and the core layer 14' during the preceding film-forming step (FIG. 7c). Then, the surface of the assembly is removed until the surface of the substrate 12 is exposed either by physical polishing or chemical etching (FIG. 7d). This results in a core 14 formed in the recess 12a of the substrate 12, and the core 14 and the substrate 12 jointly define a planar surface.

Figure 7E:
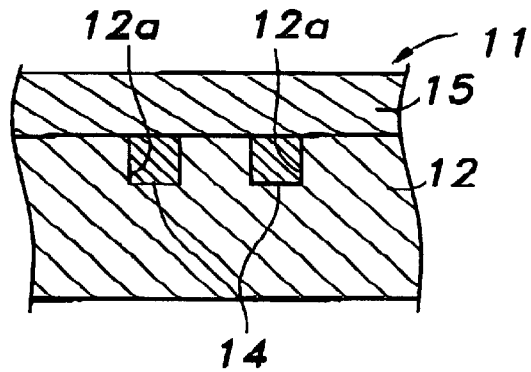

An upper clad layer 15 essentially made of SiO$_2$ and having a relatively lower refractive index is formed on the planar surface jointly defined by the core 14 and the substrate 12 by a low-temperature film-forming process such as CVD (FIG. 7e). The assembly is then cut into the desired size and shape, and the input and output ends of the device are polished into optical planes.

Figure 8A:
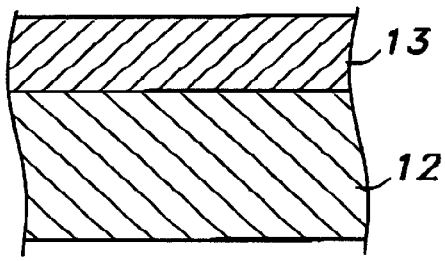
FIGS. 8a to 8f are views similar to FIGS. 3a to 3d showing the fabrication steps for a fourth embodiment of the present invention.
Figure 8B:
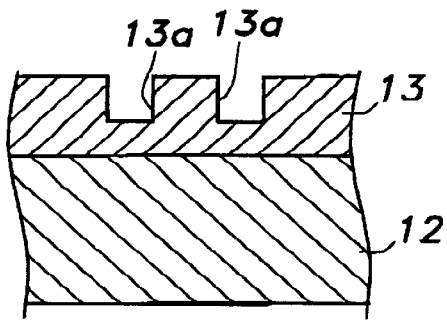

FIGS. 8a to 8f show the fabrication process for a fourth embodiment of the present invention. First of all, a buffer layer 13 serving as a lower clad layer is formed on the surface of a substrate 12 which may be made of a wafer of semiconductor, silica glass or ceramics (FIG. 8a) by a low-temperature film-forming process such as CVD. A photoresist layer is placed on the surface of the buffer layer 13 in a prescribed waveguide pattern and an etching process such as RIE is conducted on the buffer layer 13 to form a recess 13a in the prescribed pattern (FIG. 8b).

Figure 8C:
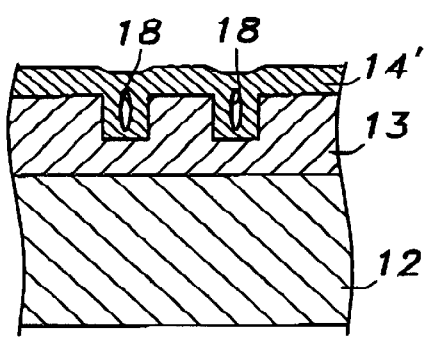

A core layer 14' is formed on the surface of the buffer layer 13 by a low-temperature film-forming process such as CVD (FIG. 8c). At this point, a dopant is added to the core layer 14' to raise the refractive index of the core layer 14' by 0.2 to 0.8% from that of the buffer layer 13. The core layer 14', in particular the part of the core layer which is inside the recess 13a, may contain voids 18 therein.

Figure 8D:
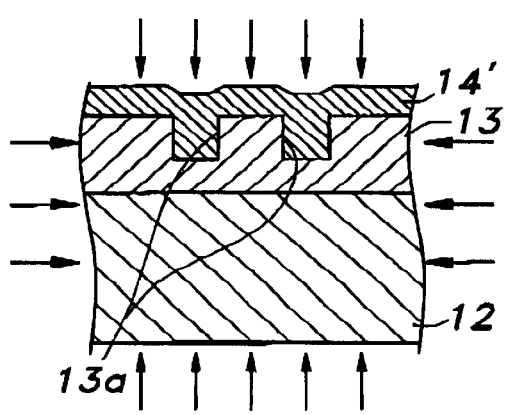
Figure 8E:
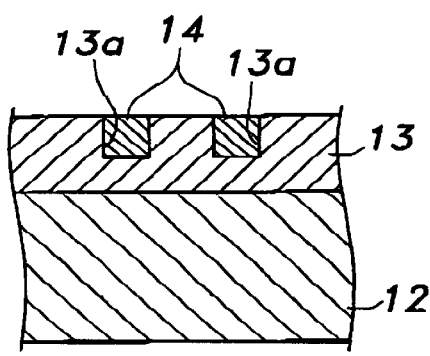

Thereafter, the assembly is subjected to the HIP process with the surface of the core layer 14' exposed so as to reduce or eliminate the voids 18 and remove the internal stresses that may have developed in the substrate 12, the buffer layer 13 and the core layer 14' during the preceding film-forming steps (FIG. 8d). Then, the surface of the assembly is removed until the surface of the buffer layer 13 is exposed either by physical polishing or chemical etching (FIG. 8e). This results in a core 14 formed in the recess 13a of the buffer layer 13, and the core 14 and the buffer layer 13 jointly define a planar surface.

Figure 8F:
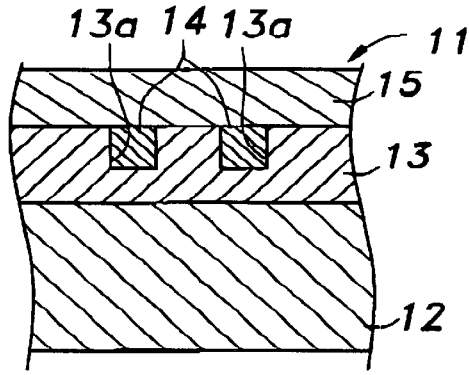
Figure 10:
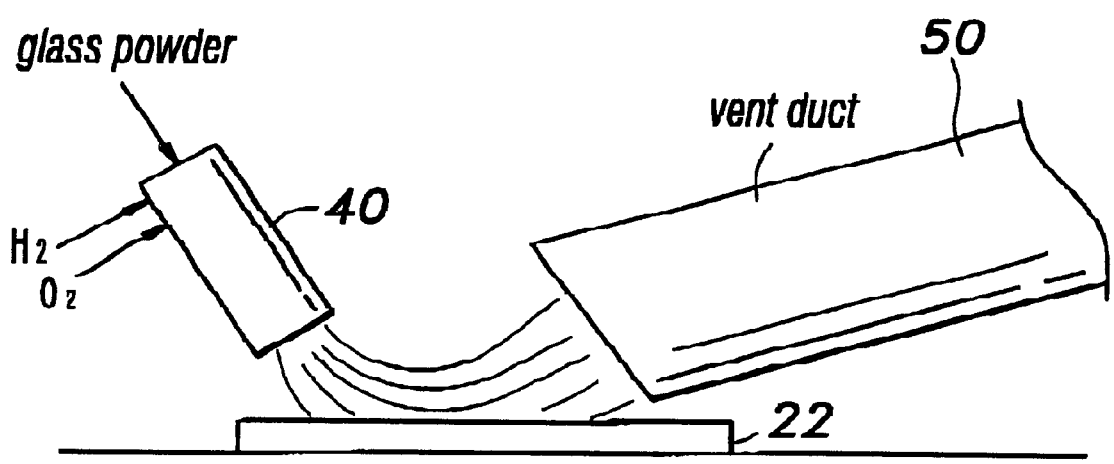
FIG. 10 is a schematic view of a FHD device for conducting a FHD process according to the present invention.

An upper clad layer 15 essentially made of SiO$_2$ and having a relatively lower refractive index is formed on the planar surface jointly defined by the core 14 and the buffer layer 13 by a low-temperature film-forming process such as CVD (FIG. 8f). The assembly is then cut into the desired size and shape, and the input and output ends of the device are polished into optical planes.

FIGS. 9a to 9e show the fabrication process for a fifth embodiment of the present invention First of all, a buffer layer 23 is formed on the surface of a substrate 22 which may consist of a wafer made of semiconductor, silica glass or ceramics (FIG. 9a) by the flame hydrolysis deposition (FHD) process. The FHD process is typically conducted by feeding glass powder into the flame of a torch 40 for burning the mixture of hydrogen and oxygen gases as illustrated in FIG. 12. The glass powder is heated in the flame, and is deposited on the surface of the substrate as it is hydrolyzed. The deposited glass is heated, and forms a film over the surface of the substrate 22. A vent duct 50 rapidly vents the gas which is produced from the heating of the glass powder. However, the FHD is not limited to this process using an oxyhydrogen torch, but may also consist of other processes in which glass powder is fed into a flame, and blown onto the surface of the substrate to form a film thereon. The buffer layer 23 typically consists of $SiO_2$.

A core layer 24' essentially consisting of $SiO_2$ is similarly formed by the FHD process on the surface of the buffer layer 23. At this time, the core layer 24' is appropriately doped by using one or more of the dopants selected from a group consisting of phosphorus (P), titanium (Ti), germanium (Ge), aluminum (Al), Boron (B) and fluoride (F) for the purpose of increasing the refractive index of the core layer 24' by 0.2 to 0.8% over that of the buffer layer 23. Phosphorus (P), titanium (Ti), germanium (Ge) and aluminum (Al) are known to raise the refractive index while aoron (B) and fluoride (F) are known to lower the refractive index. By using one of them or two or more of them in combination, a desired refractive index can be achieved. Typically, the refractive index of the core layer 24' is matched with or made to agree with that of the core of the optically fiber that is to be connected to the optical waveguide device.

If necessary, the assembly may be subjected to a preliminary heating process at a high pressure or at the atmospheric pressure. Then, a photoresist layer is placed on the surface of the core layer 24' in a proscribed waveguide pattern and an etching process such as the RIE process is conducted on the core layer 24' to form a core 24 in the prescribed pattern (FIG. 9*c*).

Thereafter, an upper clad layer 25 essentially made of $SiO_2$ and having a relatively low refractive index is placed on the surface of the core 24 and the buffer layer 23 by the FHD process (FIG. 9*d*). The refractive index of the upper clad layer 25 is typically identical to that of the buffer layer 23 which is lower than that of the core 24. At this point, voids 28 tend to develop in the upper clad layer 25 particularly in the regions between adjacent segments of the core 24. This is particularly pronounced when an adequate amount of dopant for lowering the softening point is not added to the upper clad layer 25.

To reduce or eliminate such voids 28, the assembly is subjected to the HIP process with the surface of the core layer 24' exposed so as to reduce or eliminate the voids 28 and remove the internal stresses that may have developed in the substrate 22, the buffer layer 23, the core 24 and the upper clad layer 25 during the preceding film-forming steps (FIG. 9*e*). The assembly is then cut into the desired size and shape, and the input and output ends of the device are polished into optical planes.

According to the parametric experiments conducted by the examiner, the temperature and pressure conditions for eliminating voids substantially agreed to those which were observed when the similar experiments were conducted on the device which were based on the low-temperature film-forming process as opposed to the FHD process. However, the conditions may vary depending on the kinds and amounts of dopants that are added to the upper clad layer to control the softening point thereof. Typically, the pressure and temperature should be selected as low as possible so long as voids can be eliminated to a tolerable level. In particular, according to the experiments conducted by the inventors, the HIP process can be applied to the device without using any protective layer if any excessive pressure or temperature is not selected for the HIP process.

FIGS. 11*a* to 11*f* show the fabrication process for a sixth embodiment of the present invention. First of all, a buffer layer 33 serving as a lower clad layer is formed on the surface of a substrate 32, which may consist of a wafer made of semiconductor, silica glass or ceramics (FIG. 11*a*), by the FHD process. A photoresist layer is placed on the surface of the buffer layer 33 in a prescribed waveguide pattern and an etching process such as the RIB process is conducted on the buffer layer 33 to form a recess 33*a* in the prescribed pattern (FIG. 11*b*).

A core layer 34' is formed on the surface of the buffer layer 33 likewise by the FHD process (FIG. 11*c*). At this point, a dopant is added to the core layer 34' to raise the refractive index of the core layer 34' by 0.2 to 0.8% from that of the buffer layer 33. The core layer 34', in particular the part of the core layer which is inside the recess 33*a*, may contain voids 38 therein.

Thereafter, the assembly is subjected to the HIP process with the surface of the core layer 34' exposed so as to reduce or eliminate the voids 38 and remove the internal stresses that may have developed in the substrate 32, the buffer layer 33 and the core layer 34' during the preceding film-forming steps (FIG. 11*d*). Then, the surface of the assembly is removed until the surface of the buffer layer 33 is exposed either by physical polishing or chemical etching (FIG. 11*e*). This results in a core 34 formed in the recess 33*a* of the buffer layer 33, and the core 34 and the substrate 32 jointly define a planar surface.

An upper clad layer 35 essentially made of $SiO_2$ and having a relatively lower refractive index is formed on the planar surface jointly defined by the core 34 and the substrate 34 again by the FHD process (FIG. 11*f*). The assembly is then cut into the desired size and shape, and the input and output ends of the device are polished into optical planes.

Figure 12A:
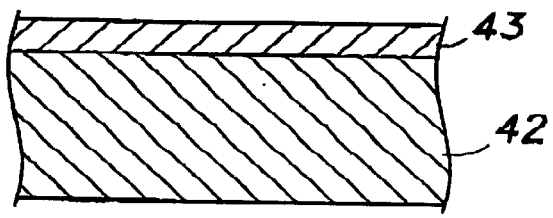
FIGS. 12a to 12e are views similar to FIGS. 3a to 3d showing the fabrication steps for a seventh embodiment of the present invention.
Figure 12B:
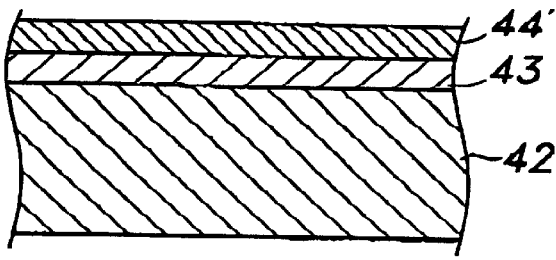
Figure 12C:
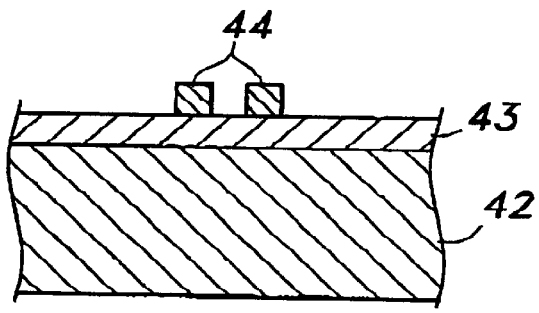

FIGS. 12*a* to 12*c* show the fabrication process for a seventh embodiment of the present invention. First of all, a buffer layer 43 is formed on the surface of a substrate 42 which may consist of a wafer made of semiconductor, silica glass or ceramics (FIG. 12*a*) by the FHD process. A core layer 44' essentially consisting of SiOis formed by a low-temperature film-forming process such as the CVD process on the surface of the buffer layer 43. At this time, the core layer 44' is appropriately doped by using one or more of the dopants selected from a group consisting of phosphorus (P), titanium (Ti), germanium (Ge), aluminum (Al), boron (B) and fluoride (F) for the purpose of increasing the refractive index of the core layer 44' by 0.2 to 0.8% over that of the buffer layer 43. Phosphorus (P), titanium (Ti), germanium (Ge) and aluminum (Al) are known to raise the refractive index while boron (B) and fluoride (P) are known to lower the refractive index. By using one of them or two or more of them in combination, a desired refractive index can be achieved. Typically, the refractive index of the core layer 44' is matched with or made to agree with that of the core of the optically fiber that is to be connected to the optical waveguide device.

If necessary, the assembly may be subjected to a preliminary heating process at a high pressure or at the atmospheric pressure. Then, a photoresist layer is placed on the surface of the core layer 44' in a prescribed waveguide pattern and an etching process such as the RIB process is conducted on the core layer 44' to form a core 44 in the prescribed pattern (FIG. 12*c*).

Figure 12D:
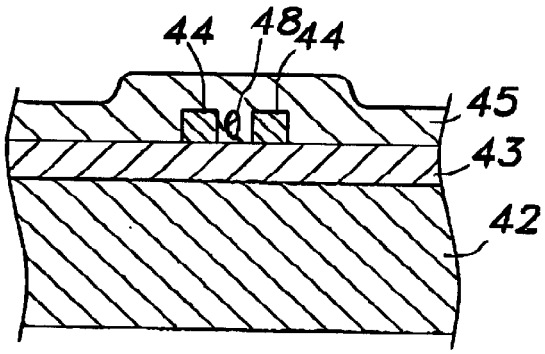

Thereafter, an upper clad layer 45 essentially consisting of SiO₂ and having a relatively low refractive index is placed on the surface of the core 44 and the buffer layer 43 by the FED process (FIG. 12d). The refractive index of the upper clad layer 43 may be identical to that of the buffer layer 43 which is lower than that of the core 44. At this point, voids 48 tend to develop in the upper clad layer 45 particularly in the regions between adjacent segments of the core 44. This is particularly pronounced when an adequate amount of dopant for lowering the softening point is not added to the upper clad layer 45.

Figure 12E:
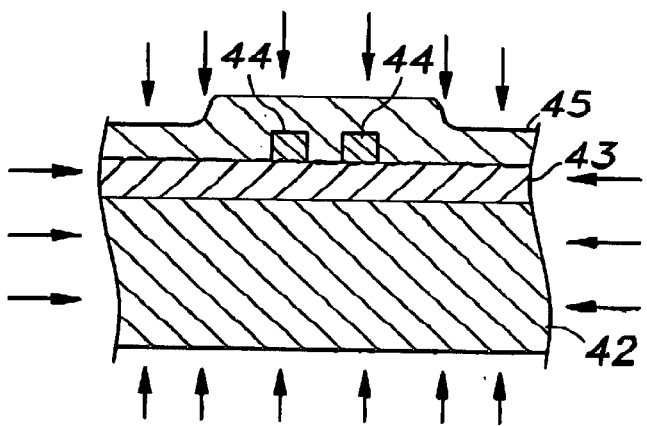

To reduce or eliminate such voids, the device 41 is subjected to the HIP process with the surface of the core layer 44' exposed so as to reduce or eliminate the voids 48 and remove the internal stresses that may have developed in the substrate 42, the buffer layer 43, the core 44 and the upper clad layer 45 during the preceding film-forming steps (FIG. 12e). The assembly is then cut into the desired size and shape, and the input and output ends of the device are polished into optical planes.

According to the parametric experiments conducted by the examiner, the temperature and pressure conditions for eliminating voids substantially agreed to those which were observed when the similar experiments were conducted on the device which were based strictly on the low-temperature film-forming process as opposed to the combination of the low-temperature film-forming process and the FHD process. However, the conditions may vary depending on the kinds and amounts of dopants that are added to the upper clad layer to control the softening point thereof. Typically, the pressure and temperature should be selected as low as possible so long as voids can be eliminated to a tolerable level. In particular, according to the experiments conducted by the inventors, the HIP process can be applied to the device without using any protective layer if any excessive pressure or temperature is not selected for the HIP process Although the present invention has been described in terms of preferred embodiments thereof, it is obvious to a person skilled in the art that various alterations and modifications are possible without departing from the scope of the present invention which is set forth in the appended claims.

What is claimed is:

1. A method for fabricating a planar optical waveguide device having a plurality of core segments formed between a lower clad layer and an upper clad layer, comprising the steps of:

providing a lower clad layer;

forming a recess corresponding to a desired pattern of core segments in said lower clad layer;

forming a core layer on said lower clad layer including an interior of said recess;

conducting a hot isostatic pressing process on an assembly of said lower clad layer and said core layer at a temperature higher than 800° C. and a pressure higher than 1,000 kgf/cm²;

removing a surface layer from an assembly of said lower clad layer and said core layer until a surface of said lower clad layer is exposed, and said lower clad layer and said core layer in said recess jointly define a planar surface; and forming an upper clad layer on said planar surface jointly defined by said lower clad layer and said core layer.

2. A method for fabricating a planar optical waveguide device according to claim 1, wherein said lower clad layer consists of a substrate.

3. A method for fabricating a planar optical waveguide device according to claim 1, wherein said lower clad layer consists of a buffer layer formed on a substrate.

4. A method for fabricating a planar optical waveguide device according to claim 1, wherein said lower clad layer, core layer and upper clad layer are all formed by a flame hydrolysis deposition process.

5. A method for fabricating a planar optical waveguide device according to claim 1, wherein said lower clad layer, core layer and upper clad layer are all formed by a film-forming process selected from the group consisting of CVD and PVD.

6. A method for fabricating a planar optical waveguide device according to claim 1, wherein at least one of said lower clad layer, core layer and upper clad layer are formed by a flame hydrolysis deposition process while the remaining layers are formed by a film-forming process selected from the group consisting of CVD and PVD.

7. A method for fabricating a planar optical waveguide device according to claim 1, wherein said hot isostatic pressing process is conducted with an outer surface of said core layer substantially exposed.

* * * * *